Aug. 1, 1939.  C. CARLSON  2,167,636
OAR OPERATING MECHANISM
Filed Dec. 8, 1937  3 Sheets-Sheet 1

INVENTOR.
Conrad Carlson.
BY Moses & Nolte
ATTORNEYS

Aug. 1, 1939.  C. CARLSON  2,167,636
OAR OPERATING MECHANISM
Filed Dec. 8, 1937  3 Sheets-Sheet 2
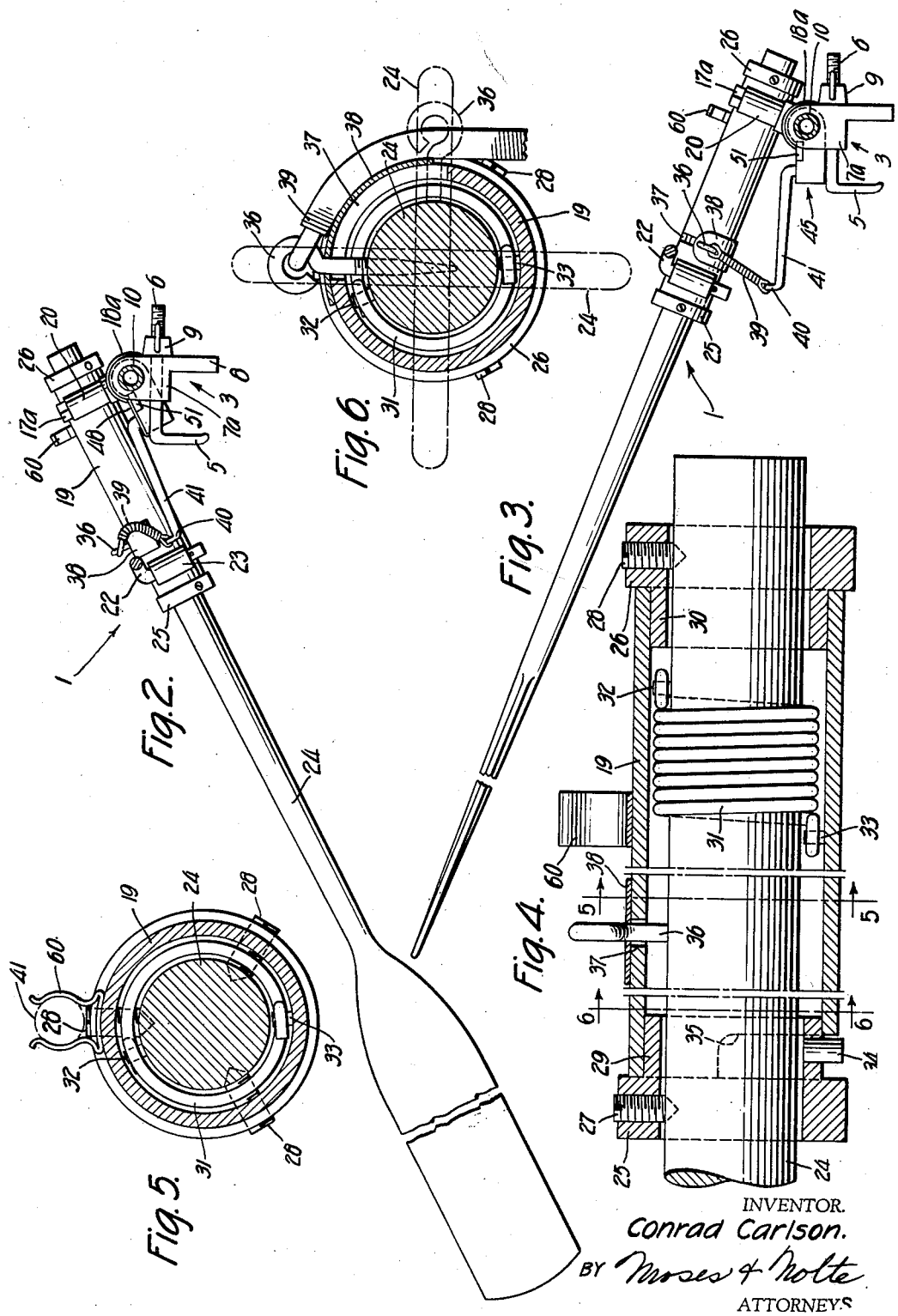
INVENTOR.
Conrad Carlson.
BY Moses & Nolte
ATTORNEYS

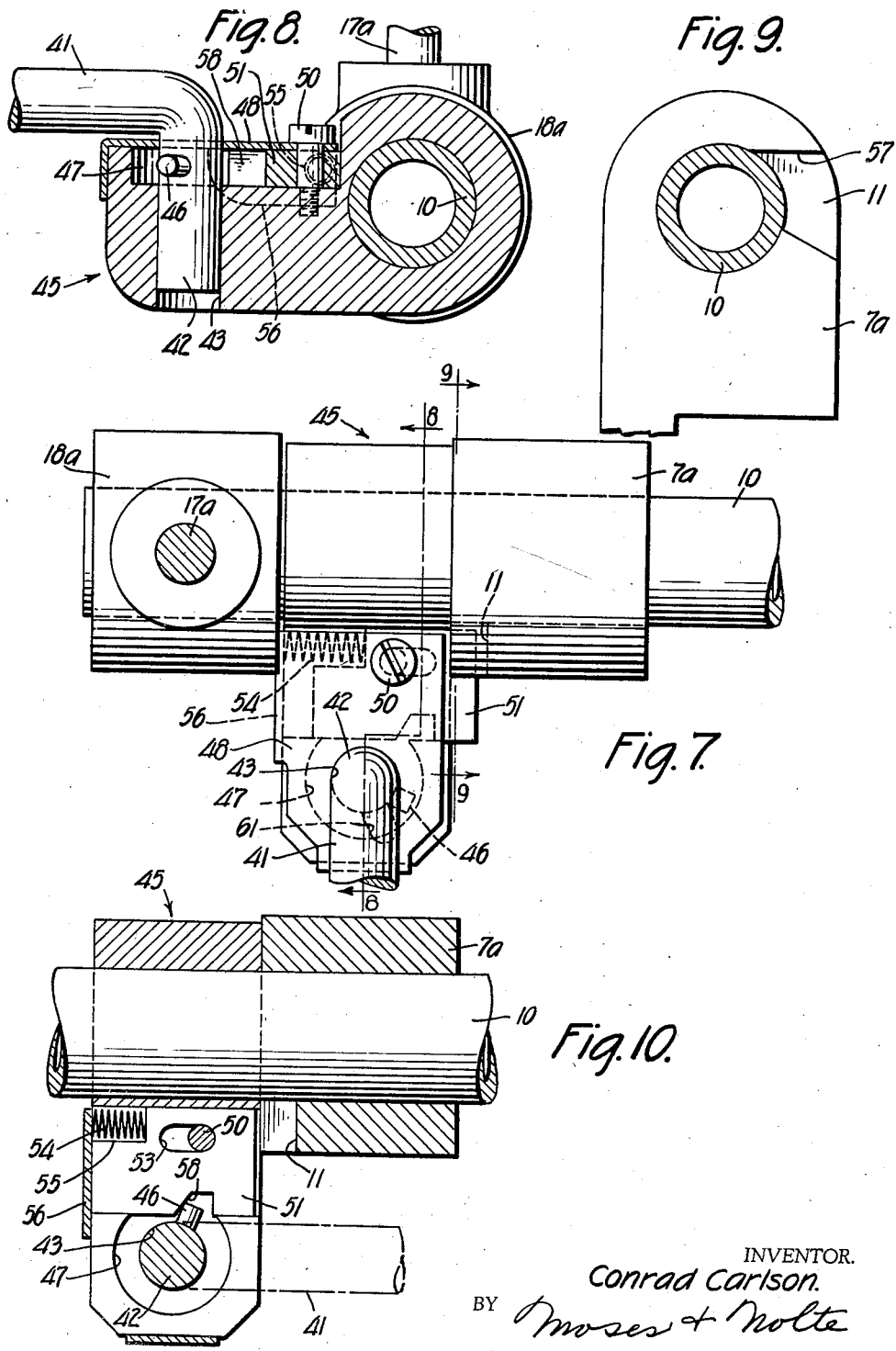

Patented Aug. 1, 1939

2,167,636

UNITED STATES PATENT OFFICE 2,167,636

OAR OPERATING MECHANISM

Conrad Carlson, Brooklyn, N. Y.

Application December 8, 1937, Serial No. 178,632

14 Claims. (Cl. 9—25)

This invention relates to oar controlling and operating mechanism for rowboats, and is in the nature of an improvement upon the inventions disclosed in my Patent No. 2,058,410 granted October 27, 1936, and my pending application Serial No. 178,631 filed December 8, 1937, for Oar operating mechanism.

In my said prior patent and application, disclosure is made of oar operating mechanism for enabling the rower to row in the normal manner but to propel the boat in the direction in which he is facing. The present invention has to do with rowing mechanism having the same capability.

In mechanism of the kind described, and as disclosed in my prior patent and application, the oar blades always occupy substantially vertical planes. This is a very desirable characteristic while the oars are in the water, since it assures that the two oar blades will be applied with equal effect and with maximum efficiency when being swept through the water. On the return stroke, however, it is desirable to feather the oars, that is to say, to turn the blades to horizontal attitudes so as to minimize the disturbance of any wind that may be blowing and to avoid the retardation of the boat by the action of the air upon the oar blades, as the blades move forward with, and relatively to, the boat.

It is a primary object of the present invention to provide operating mechanism in which the blades are caused automatically to assume vertical attitudes when lowered into the water, and may be caused to assume horizontal or substantially horizontal attitudes when lifted clear of the water.

Other objects and advantages will hereinafter appear.

In the drawings forming a part of this specification, and illustrating a practical and advantageous embodiment of the invention:

Fig. 2 is a vertical, sectional view, taken on the line 2—2 of Fig. 1 looking in the direction of the arrows and showing the oar blade in substantially its lowermost position and disposed in a plane substantially at right angles to the boat;

Fig. 3 is a view similar to Fig. 2, showing the oar blade raised substantially to its highest position and the oar rotated through approximately 90° from its attitude of Fig. 2;

Fig. 4 is a fragmentary, vertical, sectional view, taken on the line 4—4 of Fig. 1, looking in the direction of the arrows;

Fig. 5 is a vertical, sectional view, taken on the line 5—5 of Fig. 1, looking in the direction of the arrows;

Fig. 6 is a vertical, sectional view taken on the line 6—6 of Fig. 4, looking in the direction of the arrows;

Fig. 7 is a fragmentary, plan view, showing the forward end of the oar supporting means, the view being on a somewhat larger scale than Figs. 4, 5 and 6;

Fig. 8 is a vertical, sectional view taken on the line 8—8 of Fig. 7, looking in the direction of the arrows;

Fig. 9 is a vertical, sectional view taken on the line 9—9 of Fig. 7, looking in the direction of the arrows; and Fig. 10 is a horizontal, sectional view illustrating substantially the same parts as are shown in Fig. 7, but with certain of the parts in a different relation to one another from the relation illustrated in Fig. 7.

Figure 1:
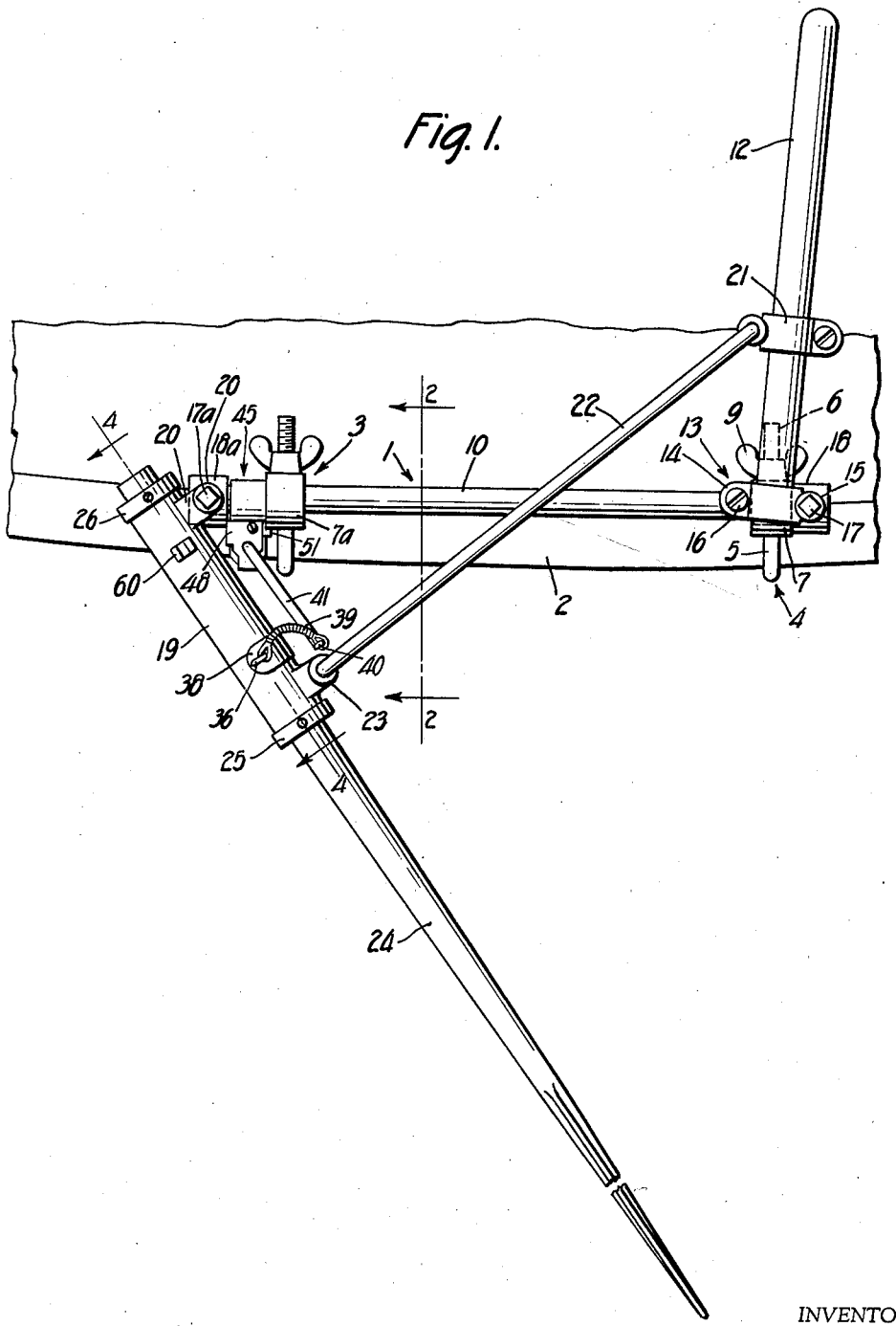
Fig. 1 is a fragmentary, plan view showing a left hand oar operating unit applied to a boat.

The drawings illustrate a left hand unit 1, applied to the left gunwale of a row boat 2. The unit comprises forward and rear gunwale clamps 3 and 4. The gunwale clamp 4 comprises a hook 5 having a threaded stem 6 passed freely through the body of a complementary clamping member 7. The complementary clamping member 7 includes a jaw 8 opposed to the hook 5. A wing nut 9 is threaded onto the stem 6 and is operated to force the clamping jaws 5 and 8 toward one another. A clamping member 7a forms a bearing for the front end of a shaft 10.

The forward clamp 3 is the same as the clamp 4 in all respects save that the forward clamping member 7a is formed with a slot or notch 11 for a purpose which will subsequently be pointed out. Not all of the elements of the rear clamping member 4 which have been referred to are actually illustrated, but the same reference numerals have been applied to the corresponding parts of the forward clamp 3 as seen particularly in Figs. 2 and 3.

The unit also includes an operating arm 12 which is secured in a clamp 13. The clamp 13 comprises a split ring having ears 14 and a bearing sleeve 15. The ears are forced toward one another by means of a bolt or screw 16 and a nut (not shown) which is threaded upon the lower end of the screw 16. A pivot bolt 17 is passed freely through the bearing sleeve 15 and is threaded into a supporting sleeve or bracket 18 which encircles the rear extremity of the shaft 10. The pivot bolt is turned into firm engagement with the shaft 10 so that it functions not only as a pivot bolt, but as a set screw for fixing the bracket or sleeve 18 angularly and longitudinally with relation to the shaft 10. A pivot bolt 17a and an oar carrying bracket or sleeve 18a similar, respectively, to the bolt 17 and to the bracket or sleeve 18, are fixed upon the shaft 10 at the forward extremity thereof.

The pivot bolt 17a supports an oar carrying sleeve 19, the sleeve being constrained to participate in rotative movement of the shaft 10 but being also rotatable about the axis of the pivot bolt 17a. The pivot bolt 17a extends parallel to the pivot bolt 17 and both bolts extend at right angles to the shaft 10. The sleeve 19 is pivotally mounted upon the pivot bolt 17a by means of an ear 20 integral with the sleeve.

A clamp 21 (in all respects similar to the clamp 13) is secured to the operating lever 12 at a distance inward toward the center of the boat from the fulcrum of the lever, that is to say, from the axis of the bolt 17. An operating link 22 is pivotally connected at its rear end to the clamp 21, and at its forward end to an ear 23 integral with the sleeve 19.

The link 22 crosses the axis of the shaft 10. When the operating lever is drawn rearward it acts to draw the sleeve 19 to the rear, and when the operating lever is thrust forward it acts to thrust the sleeve 19 forward. Depressing the operating lever raises the sleeve 19, however, and raising the operating lever depresses the sleeve 19.

An oar 24 is passed through the sleeve 19 and is secured therein against longitudinal movement by means of collars 25 and 26 which are fixed to the oar at opposite ends of the sleeve 19. The collar 25 is secured to the oar by a plurality of set screws 27 (see particularly Figs. 4 and 5), and the collar 26 is secured to the oar by a plurality of set screws 28 see Fig. 6 also. The collars 25 and 26 include, respectively, reduced bearing extensions 29 and 30 upon which the sleeve 19 is journalled.

A coil spring 31 encircles the oar 24, being secured at one end to a pin 32 fast with the oar and at the opposite end to a pin 33 fast with the sleeve 19. The tendency of the spring is to rotate the oar counterclockwise (as viewed in Figs. 1 and 6).

A pin 34, Fig. 4, is fixed on the bearing member 29 and extends outward through a notch 35 formed in one end of the sleeve 19. The pin and notch, in cooperation with the spring 31, normally maintain the oar blade in a vertical plane as seen in Fig. 2, but the notch is of sufficient extent to permit rotation of the oar about its own axis through approximately 90°.

Provision is made to cause the oar to be rotated about its own axis from an attitude like that illustrated in Fig. 2, to an attitude like that illustrated in Fig. 3, as an incident of the raising of the oar blade. A screw eye 36 is affixed to the oar and its shank extends outward through a slot 37 formed in the sleeve 19 so that the eye portion is located outside the sleeve. The slot 37 extends for about 90° circumferentially of the sleeve and is normally covered by an arcuate cover or shield 38 through which the shank of the screw eye 36 passes.

A flexible link 39 is connected at its upper end to the screw eye 36 and at its lower end to a hook 40 formed at the outer end of an arm 41. The flexible link 39 is illustrated as made up of a length of coil spring with eyes at its opposite ends. The link might, however, take the form of a section of chain.

The arm 41 is mounted with capacity for limited rocking movement about the axis of the shaft 10. As the shaft 10 is turned by depression of the operating lever 12 to raise the oar, the arm 41 is pulled upward with the shaft partway, and is then arrested. As the upward movement of the oar is continued, the link 39 exerts an increased pull upon the screw eye 37 and thereby rotates the oar against the force of the spring 31 to the attitude illustrated in Fig. 3. By maintaining the operating lever depressed as it is moved forward, the oar is caused to be carried forward, in an attitude like that shown in Fig. 3. Then as the operating lever is raised to dip the oar blade into the water, the tension on the link 39 is relaxed and the oar is rotated about its axis by the spring 31 to restore the blade to a vertical attitude before the blade reaches the water.

The mechanism for thus controlling the link 39 and the arm 41 is best illustrated in Figs. 8 to 10, inclusive. The arm 41 is formed with a downturned end 42 which is rotatably mounted in a bore 43 formed in a block 45. The block 45 is rotatably mounted upon the shaft 10, between the clamp member 7a and the forward bracket 18a. The end 42 of the arm 41 has a pin 46 projecting from it. The pin 46 is received in a recess 47 formed in the upper face of the block 45. A flanged cover plate 48 is secured to the block 45 over the recess 47 by means of a screw 50 and cooperates with the pin 46 to prevent separation of the arm 41 from the block 45.

A slide bolt 51 is slidingly mounted in the recess 47 at the inner end thereof adjacent the shaft 10, being held in place and guided in part by the screw 50. The shank of the screw 50 passes through a slot 53 formed in the slide bolt 51. A coil spring 54 is located in a recess 55 of the slide bolt 51 and bears at its opposite ends against the slide bolt and against a flange 56 of the cover plate 48, respectively. The spring 54 normally maintains the slide bolt 51 projected into the recess 11 of the clamp member 7a. Thus, when the oar is raised and pulls upward upon the arm 41, the arm is permitted to move freely upward for a time until the slide bolt 51 comes into engagement with the wall or shoulder 57, see Fig. 9, which forms the upper boundary of the notch 11. When such engagement occurs, upward movement of the block 45 is positively arrested, and as a consequence upward movement of the arm 41 is positively arrested. Continued upward movement of the oar results in rotation of the oar about its own axis as has already been pointed out.

It is desirable when the boat is at anchor or is docked that the oars and the entire operating mechanism therefor be parked within the bounds of the gunwales so that they will not be exposed to damage by other boats, or by objects floating in the water, or by the dock itself. It is evident, of course, that in the normal operating position the slide bolt 51 limits rotation of the operating parts about the axis of the shaft 10.

For the purpose of parking, however, provision is made of a notch 58 in the slide bolt 51 with which the pin 46 on the end of the arm 41 may cooperate to move the slide bolt entirely clear of the clamp member 7a. When parking, the operating lever is swung rearward into substantial alignment with the shaft 10, and the oar 24 and the sleeve 19 are thereby swung rearward into substantial parallelism with the shaft 10. The arm 41 is swung rearward by the extreme rearward movement of the oar, to the position illustrated in Fig. 10, being caused thereby to move the slide bolt 51 clear of the notch 11. The entire structure, with the exception of the clamps 3 and 4, may now be swung about the axis of the shaft 10 to carry the parts inside the bounds of the gunwale 2 upon which they are mounted.

If, instead of leaving the rowing units attached to the boat, it is wished to carry them away, this may be very readily done simply by removing the clamps 3 and 4 from the gunwale. The parts, in their parked condition, form a compact unit which may be tied together for transportation or packing.

Should an operator wish, for any reason, to render the oar feathering means temporarily inoperative, he may do so by disengaging the arm 41 from the block 45 and the cover plate 48. By swinging the oar farther forward than the forward limit of its normal stroke, the pin 46 may be made free to be aligned with a slot 61 in the plate 48. The arm 41 may then be removed from the block 45 and placed in a spring clip 60 on the sleeve 19.

I have described what I believe to be the best embodiments of my invention. I do not wish, however, to be confined to the embodiments shown, but what I desire to cover by Letters Patent is set forth in the appended claims.

I claim:

1. In an oar operating unit, the combination with an operating lever of an oar carrying sleeve, means operatively connecting the operating lever with the sleeve, to enable the rower to control movements of the sleeve about two axes substantially at right angles to one another, means supporting the oar in the sleeve with capacity for turning about the axis of the sleeve, a spring mounted within the sleeve for normally maintaining the oar in a definite rotative position with respect to the sleeve, in which the oar blade is disposed substantially vertically, and means for turning the oar relatively to the sleeve as the sleeve is moved upward to cause the oar blade to be turned to a substantially horizontal attitude.

2. In an oar operating unit, the combination with an operating lever, of an oar carrying sleeve, means operatively connecting the operating lever with the sleeve, to enable the rower to control movements of the sleeve about two axes substantially at right angles to one another, comprising an operating link connecting an inboard portion of the operating lever to an outboard portion of the sleeve, means supporting the oar in the sleeve with capacity for turning about the axis of the sleeve, a spring mounted within the sleeve for normally maintaining the oar in a definite rotative position with respect to the sleeve, in which the oar blade is disposed substantially vertically, and means for turning the oar relative to the sleeve as the sleeve is moved upward to cause the oar blade to be turned to substantially a horizontal attitude.

3. In an oar operating unit for a rowboat, in combination, a pair of shaft bearing members secured to a gunwale of the boat, a shaft journalled therein, an operating lever, means supporting the operating lever on the shaft for operation with the shaft about the shaft axis and for rotation relative to the shaft about an axis transverse to the shaft axis, an oar supporting sleeve, means supporting the sleeve on the shaft for operation with the shaft about the shaft axis and for rotation relative to the shaft about an axis transverse to the shaft axis, operating means connecting the operating lever to the sleeve, an oar mounted in the sleeve with capacity for rotation about the axis of the sleeve, a spring constraining the oar to turn in one direction about the sleeve axis, a stop on the oar coacting with the sleeve to limit such turning and thereby determine a normal operating attitude for the oar blade, a flexible link connected to the oar at the upper side thereof, an arm connected to the link, a block rockably supported on the shaft and supporting said arm for turning movement about an axis transverse to the shaft axis, and means carried by the block for coacting with one of the shaft bearing members to limit upward movement of the block and thereby cause a turning force to be applied to the oar through the arm and link as the oar is raised.

4. An oar operating unit as set forth in claim 3 wherein a cover plate is mounted on the block, and the means carried by the block for limiting upward movement of the block consists of a slide bolt mounted between the block and the cover plate, and a spring for projecting the block to effective position.

5. An oar operating unit as set forth in claim 3 wherein a cover plate is mounted on the block, and the means carried by the block for limiting upward movement of the block consists of a slide bolt mounted between the block and the cover plate, and a spring for projecting the block to effective position, and wherein the arm carried by the block includes a member operable by the arm to withdraw the slide bolt to an inoperative position.

6. An oar operating unit as set forth in claim 3 wherein a cover plate is mounted on the block, and the means carried by the block for limiting upward movement of the block consists of a slide bolt mounted between the block and the cover plate, and a spring for projecting the block to effective position, and wherein the arm carried by the block is provided with a cross pin cooperative with the cover plate to prevent separation of the arm from the block, and the cover plate is formed with a slot beyond the usual range of movement of the pin to permit separation of the arm from the block.

7. In an oar operating unit for a rowboat, in combination, a pair of shaft bearing members secured to a gunwhale of the boat, a shaft journalled therein, an operating lever, means supporting the operating lever on the shaft for operation with the shaft about the shaft axis and for rotation relative to the shaft about an axis transverse to the shaft axis, an oar supporting sleeve, means supporting the sleeve on the shaft for operation with the shaft about the shaft axis and for rotation relative to the shaft about an axis transverse to the shaft axis, operating means connecting the operating lever to the sleeve, an oar mounted in the sleeve with capacity for rotation about the axis of the sleeve, a spring constraining the oar to turn in one direction about the sleeve axis, a stop on the oar coacting with the sleeve to limit such turning and thereby determine a normal operating attitude for the oar blade, a flexible link connected to the oar at the upper side thereof, means for preventing the lower end of the link from rising above a predetermined level to cause a turning force to be applied to the oar through the arm and link as the oar is raised.

8. In an oar operating unit for a rowboat, in combination, a pair of shaft bearing members secured to a gunwhale of the boat, a shaft journalled therein, an operating lever, means supporting the operating lever on the shaft for operation with the shaft about the shaft axis and for rotation relative to the shaft about an axis transverse to the shaft axis, an oar supporting sleeve, means supporting the sleeve on the shaft for operation with the shaft about the shaft axis and for rotation relative to the shaft about an axis transverse to the shaft axis, operating means connecting the operating lever to the sleeve, an oar mounted in the sleeve with capacity for rotation about the axis of the sleeve, a spring constraining the oar to turn in one direction about the sleeve axis, a stop on the oar coacting with the sleeve to limit such turning and thereby determine a normal operating attitude for the oar blade, a flexible link connected to the oar at the upper side thereof, an arm connected to the link, a block rockably supported on the shaft and supporting said arm for turning movement about an axis transverse to the shaft axis, and means carried by the block for coacting with one of the shaft bearing members to limit upward movement of the block and thereby cause a turning force to be applied to the oar through the arm and link as the oar is raised, said arm being detachable from the block to disable the oar turning means.

9. In an oar operating unit for a row boat, in combination, a pair of shaft bearing members secured to a gunwale of the boat, a shaft journalled therein, an operating lever, means supporting the operating lever on the shaft for operation with the shaft about the shaft axis and for rotation relative to the shaft about an axis transverse to the shaft axis, an oar supporting sleeve, means supporting the sleeve on the shaft for operation with the shaft about the shaft axis and for rotation relative to the shaft about an axis transverse to the shaft axis, operating means connecting the operating lever to the sleeve, an oar mounted in the sleeve with capacity for rotation about the axis of the sleeve, a spring constraining the oar to turn in one direction about the sleeve axis, a stop on the oar coacting with the sleeve to limit such turning and thereby determine a normal operating attitude for the oar blade, a flexible link connected to the oar at the upper side thereof, an arm connected to the link, a block rockably supported on the shaft and supporting said arm for turning movement about an axis transverse to the shaft axis, and means carried by the block for coacting with one of the shaft bearing members to limit upward movement of the block and thereby cause a turning force to be applied to the oar through the arm and link as the oar is raised, said arm being detachable from the block to disable the oar turning means, and a clip mounted on the sleeve for holding the arm when the latter is detached from the block.

10. In an oar operating unit for a rowboat, in combination, a pair of shaft bearing members secured to a gunwale of the boat, a shaft journalled therein, an operating lever, means supporting the operating lever on the shaft for operation with the shaft about the shaft axis and for rotation relative to the shaft about an axis transverse to the shaft axis, an oar supporting sleeve, means supporting the sleeve on the shaft for operation with the shaft about the shaft axis and for rotation relative to the shaft about an axis transverse to the shaft axis, operating means connecting the operating lever to the sleeve, an oar mounted in the sleeve with capacity for rotation about the axis of the sleeve, a spring connecting the oar and sleeve for constraining the oar to turn in one direction about the sleeve axis, a stop on the oar coacting with the sleeve to limit such turning and thereby determine a normal upright operating attitude for the oar blade, and means responsive to upward movement of the oar to cause the oar blade to be turned from an upright to a flat attitude during the idle stroke thereof.

11. In an oar operating unit for a rowboat, in combination, a pair of shaft bearing members secured to a gunwale of the boat, a shaft journalled therein, an operating lever, means supporting the operating lever on the shaft for operation with the shaft about the shaft axis and for rotation relative to the shaft about an axis transverse to the shaft axis, an oar supporting sleeve, means supporting the sleeve on the shaft for operation with the shaft about the shaft axis and for rotation relative to the shaft about an axis transverse to the shaft axis, operating means connecting the operating lever to the sleeve, an oar mounted in the sleeve with capacity for rotation about the axis of the sleeve, a spring constraining the oar to turn in one direction about the sleeve axis, a stop on the oar coacting with the sleeve to limit such turning and thereby determine a normal operating attitude for the oar blade, a flexible link connected to the oar at the upper side thereof, an arm connected to the link, a block rockably supported on the shaft and supporting said arm for turning movement about an axis transverse to the shaft axis, means carried by the block for coacting with one of the shaft bearing members to limit upward movement of the block and thereby cause a turning force to be applied to the oar through the arm and link as the oar is raised, and means for disabling the block movement limiting means, the oar and all the parts supported by or from the shaft being then swingable about the shaft axis to the inboard side of the gunwale.

12. In an oar operating unit for a rowboat, in combination, a pair of shaft bearing members secured to a gunwale of the boat, a shaft journalled therein, an operating lever, means supporting the operating lever on the shaft for operation with the shaft about the shaft axis and for rotation relative to the shaft about an axis transverse to the shaft axis, an oar supporting sleeve, means supporting the sleeve on the shaft for operation with the shaft about the shaft axis and for rotation relative to the shaft about an axis transverse to the shaft axis, operating means connecting the operating lever to the sleeve, an oar mounted in the sleeve with capacity for rotation about the axis of the sleeve, a spring disposed within the sleeve and connected to the oar and the sleeve for constraining the oar to turn in one direction about the sleeve axis, a stop on the oar coacting with the sleeve to limit such turning and thereby determine a normal operating attitude for the oar blade, a flexible link connected to the oar at the upper side thereof, an arm connected to the link, a block rockably supported on the shaft and supporting said arm for turning movement about an axis transverse to the shaft axis, and means carried by the block for coacting with one of the shaft bearing members to limit upward movement of the block and thereby cause a turning force to be applied to the oar through the arm and link as the oar is raised.

13. In an oar operating unit, the combination with an operating lever, of an oar carrying sleeve, means operatively connecting the operating lever with the sleeve, means pivotally supporting the operating lever and sleeve for oscillation about two axes substantially at right angles to one another, means for supporting the oar for rotation within the sleeve, a spiral spring having one end connected to the oar and its other end to the sleeve for normally maintaining the oar blade substantially vertically and means for automatically rotating the oar within the sleeve through an angle of substantially 90 degrees upon depression of said operating lever.

14. A mechanism comprising the elements combined and cooperating as set forth in claim 13 and in which the sleeve is provided with a slot extending through an angle of substantially 90 degrees and a pin is connected to the oar and extends into the slot to thereby limit the turning of the oar by the spiral spring.

CONRAD CARLSON.